2,995,576
HYDROXYLACTONE PHOSPHITES
Fred Kagan and Robert D. Birkenmeyer, Kalamazoo, Mich., assignors to The Upjohn Company, Kalamazoo, Mich., a corporation of Delaware
No Drawing. Filed May 29, 1959, Ser. No. 816,734
6 Claims. (Cl. 260—343.6)

This invention relates to novel organic compounds and a process for their preparation and is more particularly directed to phosphite esters of hydroxy lactones and a process for their preparation.

The novel compounds of the invention are compounds having the formula:

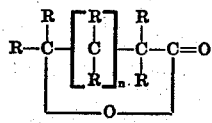

(I)

wherein one of the radicals R represents the radical —O—P(OR$_1$)$_2$, in which R$_1$ represents a lower-hydrocarbon radical, the remainder of the radicals R are selected from the group consisting of hydrogen and lower-alkyl, and $n$ is an integer having a value from 1 to 2.

The term "lower-alkyl" as used in this specification means an alkyl radical containing from 1 to 6 carbon atoms, inclusive, such as methyl, ethyl, propyl, butyl, amyl, hexyl, and isomeric forms thereof. The term "lower-hydrocarbon radical" includes lower-alkyl radicals as hereinbefore defined, lower-alkenyl radicals containing from 3 to 6 carbon atoms, inclusive, such as propenyl, butenyl, pentenyl, hexenyl and isomeric forms thereof, lower-aralkyl radicals containing from 7 to 13 carbon atoms, inclusive, such as benzyl, phenethyl, benzhydryl, and the like, and lower-aryl radicals containing from 6 to 12 carbon atoms, inclusive, such as phenyl, tolyl, xylyl, naphthyl, biphenylyl, and the like.

It is an object of the present invention to provide the compounds having the general Formula I above. It is a further object of the invention to provide a process for the preparation of said compounds. Other objects of the invention will be apparent to those skilled in the art.

The novel compounds of the invention exhibit activity as inhibitors of gastric secretion. In addition, the novel compounds of the invention are useful as intermediates in the synthesis of pharmacologically active compounds related to pantothenic acid. Illustratively, the compound pantolactone 2-diethyl phosphite can be reacted with taurine to yield the 2-diethyl phosphite of pantoyltaurine, which compound exhibits activity as a pantothenic acid antagonist.

The novel compounds of the invention are also useful as intermediates in other chemical syntheses. For example, they dissolve in aqueous alkali-metal hydroxides to form the alkali-metal salts of the corresponding hydroxy carboxylic acids; the free acids can be isolated therefrom by acidification. The compounds of Formula I also react with ammonia to form the corresponding hydroxy carboxamides.

The novel compounds having the Formula I above can be prepared by reacting an hydroxy lactone having the formula:

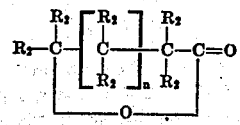

(II)

wherein one of the radicals R$_2$ represents an hydroxy radical and the remainder of the radicals R$_2$ are selected from the group consisting of hydrogen and lower-alkyl, and $n$ has the significance hereinbefore defined, with a phosphite ester having the formula P(OR$_1$)$_3$ wherein R$_1$ has the significance hereinbefore defined. The reaction is carried out advantageously by heating the reactants together at a temperature within the range of about 90° C. to about 160° C. If desired, the reaction can be conducted in the presence of an inert organic solvent such as toluene, xylene, cumene, cymene, and the like. The length of time for which it is necessary to heat the reactants, in order to obtain optimum yields, varies according to the particular reaction temperature but in general the reaction time is advantageously within the range of about 4 to about 48 hours. The required compound having the Formula I above can be isolated from the reaction mixture by conventional methods, for example, by fractional distillation of the mixture.

The proportions of hydroxy lactone and phosphite ester employed in the process of the invention can vary within wide limits. However, in order to obtain optimum yields, simplify purification, etc., it is desirable that the reactants be present in approximately equimolar proportions.

The hydroxy lactones having the Formula II, above, which are employed as starting materials in the process of the invention, can be prepared by methods which are well-known in the art. For example, the compounds having the Formula II above can be prepared by lactonization of the corresponding dihydroxy acids having the formula:

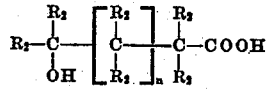

(III)

wherein R$_2$ and $n$ have the significance hereinbefore defined. The lactonization can be accomplished in a convenient manner by heating the dihydroxy acid of the above Formula III in aqueous solution according to the procedure described by Nef [Ann. 376, 33 (1910)] for the preparation of α-hydroxybutyrolactone. Hydroxy lactones which are suitable for use as starting materials in the process of the invention include 2-hydroxy-γ-valerolactone,
2-hydroxy-γ-butyrolactone,
3-hydroxy-γ-butyrolactone,
5-hydroxy-γ-valerolactone,
4-hydroxy-γ-valerolactone,
4-hydroxy-2-methyl-γ-butyrolactone,
3-hydroxy-2,4,4-trimethyl-δ-valerolactone,
2-hydroxy-2,4,4-trimethyl-γ-butyrolactone,
pantolactone (2-hydroxy-3,3-dimethyl-γ-butyrolactone),
and the like.

Phosphite esters having the formula P(OR$_1$)$_3$, wherein R$_1$ has the significance hereinbefore defined, which are suitable for use in the process of the invention can be prepared by methods well-known in the art. Thus, for example, they can be prepared by reaction of phosphorus trichloride with a compound R$_1$OH, R$_1$ being as herein before defined, in the presence of ammonia to keep the reaction product substantially neutral, according to the process described in U.S. Patent 2,678,940. Such esters include trimethyl phosphite, triethyl phosphite, tri-n-propyl phosphite, triisopropyl phosphite, tri-n-butyl phosphite, tri-n-amyl phosphite, tribenzyl phosphite, benzyl diethyl phosphite, triphenyl phosphite, triallyl phosphite, trimethallyl phosphite, tri-(2-butenyl) phosphite, tri-(1-benzylethyl) phosphite, triphenethyl phosphite, tri-(3-phenylpropyl) phosphite, phenyl diethyl phosphite, phenyl di-m-tolyl phosphite, and the like.

When used in therapy, the novel compounds of the invention having the Formula I above can be combined with solid or liquid pharmaceutical carriers and formulated in the form of tablets, pills or capsules, using starch, talc, and like excipients, particularly in the case of those compounds which are solids at temperatures below about 50° C. In the case of those compounds which are liquids at ordinary temperature, it is preferred to encapsulate them, e.g., in soft elastic capsules or hard-filled capsules. The novel compounds of the invention can also be dissolved or suspended in suitable solvents or vehicles, for oral or parenteral administration.

The following examples are illustrative of the process and products of the present invention, but are not to be construed as limiting.

*Example 1.—Pantolactone 2-diethyl phosphite monohydrate*

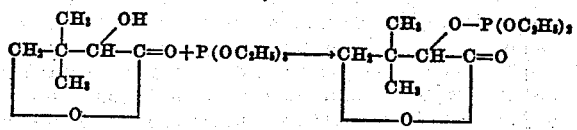

In a 1-liter flask fitted with reflux condenser, were placed 130 g. (1.0 mole) of pantolactone [Monatsh. 39, 295 (1919)] and 166 g. (1.0 mole) of triethyl phosphite. After heating under reflux (about 150° C.) for 20 hours, the reaction mixture was distilled under reduced pressure. The fractions which distilled were successively: unchanged triethyl phosphite having a boiling point of 48 to 53° C. at a pressure of 16 mm. of mercury, unchanged pantolactone having a boiling point of 119 to 123° C. at a pressure of 15 mm. of mercury, and the required product having a boiling point of 151 to 155° C. at a pressure of 15 mm. of mercury. The latter fraction was redistilled under reduced pressure. There was thus obtained pantolactone 2-diethyl phosphite monohydrate in the form of a liquid having a boiling point of 88° C. at a pressure of 0.1 mm. of mercury; $n_D^{25}$ 1.4536.

*Anal.*—Calcd. for $C_{10}H_{19}O_5P \cdot H_2O$: C, 44.77; H, 7.89; P, 11.55; $H_2O$, 6.71. Found: C, 44.43; H, 7.61; P, 11.81; $H_2O$, 7.03.

*Example 2.—γ-valerolactone 2-diethyl phosphite*

Using the procedure described in Example 1, but substituting 2-hydroxy-γ-valerolactone [Ann. 334, 68 (1904)] for pantolactone, there was obtained γ-valerolactone 2-diethyl phosphite.

Similarly, using the procedure described in Example 1, but substituting for pantolactone the following lactones: 2-hydroxy-γ-butyrolactone [Ann. 376, 1 (1910)], 3-hydroxy-γ-butyrolactone [Compt. rend. 146, 1282 (1908)], 5-hydroxy-γ-valerolactone [Ber. 42, 1228 (1909)], 3-hydroxy-2,4,4-trimethyl-δ-valerolactone [Monatsh. 26, 429 (1905)], 4-hydroxy-γ-valerolactone (Beilstein, 18, I, 296), 4-hydroxy-2-methyl-γ-butyrolactone (Beilstein, 18, I, 296), and 2-hydroxy-2,4,4-trimethyl-γ-butyrolactone [Monatsh. 37, 44 (1916)], there were obtained respectively: γ-butyrolactone 2-diethyl phosphite, γ-butyrolactone 3-diethyl phosphite, γ-valerolactone 5-diethyl phosphite, 2,4,4-trimethyl-δ-valerolactone 3-diethyl phosphite, γ-valerolactone 4-diethyl phosphite, 2-methyl-γ-butyrolactone 4-diethyl phosphite, and 2,4,4-trimethyl-γ-butyrolactone 2-diethyl phosphite.

*Example 3.—Pantolactone 2-diallyl phosphite*

Using the procedure described in Example 1, but substituting triallyl phosphite (U.S. Patent 2,456,231) for triethyl phosphite, there was obtained pantolactone 2-diallyl phosphite.

*Example 4.—Pantolactone 2-di-(1-benzylethyl) phosphite*

Using the procedure described in Example 1, but substituting tri-(1-benzylethyl) phosphite (J.C.S. 1953, 2073) for triethyl phosphite, there was obtained pantolactone 2-di-(1-benzylethyl) phosphite.

*Example 5.—Pantolactone 2-diphenyl phosphite*

Using the procedure described in Example 1, but substituting triphenyl phosphite for triethyl phosphite, there was obtained pantolactone 2-diphenyl phosphite.

It is to be understood that the invention is not to be limited to the exact details of operation or exact compounds shown and described, as obvious modifications and equivalents will be apparent to one skilled in the art and the invention is therefore to be limited only by the scope of the appended claims.

We claim:

1. A compound having the formula:

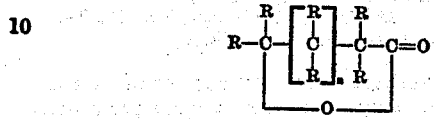

wherein one of the radicals R represents the radical $-O-P(OR_1)_2$ in which $R_1$ is selected from the class consisting of lower-alkyl, alkenyl from 3 to 6 carbon atoms, inclusive, aralkyl from 7 to 13 carbon atoms, inclusive, and aryl from 6 to 12 carbon atoms, inclusive, the remainder of the radicals R are selected from the group consisting of hydrogen and lower-alkyl, and $n$ is an integer having a value from 1 to 2.

2. Pantolactone 2-diethyl phosphite having the formula:

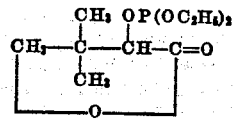

3. A process for the preparation of a compound having the formula:

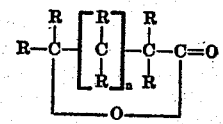

wherein one of the radicals R represents the radical $-O-P(OR_1)_2$ in which $R_1$ is selected from the class consisting of lower-alkyl, alkenyl from 3 to 6 carbon atoms, inclusive, aralkyl from 7 to 13 carbon atoms, inclusive, and aryl from 6 to 12 carbon atoms, inclusive, the remainder of the radicals R are selected from the group consisting of hydrogen and lower-alkyl, and $n$ is an integer having a value from 1 to 2, which comprises heating at a temperature within the range of about 90° C. to about 160° C. a mixture of (a) an hydroxy lactone having the formula:

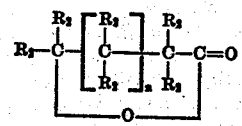

wherein one of the radicals $R_2$ represents an hydroxy radical and the remainder of the radicals $R_2$ are selected from the group consisting of hydrogen and lower-alkyl, and $n$ has the significance stated above, and (b) a phosphite ester having the formula $P(OR_1)_3$ in which the radical $R_1$ has the significance stated above.

4. A process for the preparation of a pantolactone 2-phosphite having the formula:

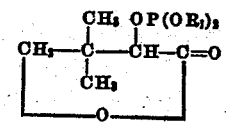

wherein $R_1$ is selected from the class consisting of lower-alkyl, alkenyl from 3 to 6 carbon atoms, inclusive, aralkyl from 7 to 13 carbon atoms, inclusive, and aryl from 6 to 12 carbon atoms, inclusive, which comprises heating pantolactone with a phosphite ester having the formula $P(OR_1)_3$ where $R_1$ has the significance stated above at a temperature within the range of about 90° C. to about 160° C.

5. A process for the preparation of a pantolactone 2-phosphite having the formula:

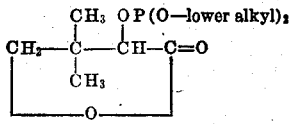

which comprises heating pantolactone with a tri-(loweralkyl)-phosphite at a temperature within the range of about 90° C. to about 160° C.

6. A process for the preparation of pantolactone 2-diethyl phosphite having the formula:

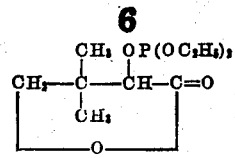

which comprises heating pantolactone with triethyl phosphite at a temperature within the range of about 90° C. to about 160° C.

References Cited in the file of this patent
UNITED STATES PATENTS

| | | |
|---|---|---|
| 2,676,976 | Baddiley | Apr. 27, 1954 |
| 2,716,130 | Baddiley | Aug. 23, 1955 |